United States Patent
Leisner et al.

(10) Patent No.: US 8,604,385 B2
(45) Date of Patent: Dec. 10, 2013

(54) PORTABLE AIR COMPRESSOR/GENERATOR CONTROL METHOD AND SYSTEM

(75) Inventors: John C. Leisner, Appleton, WI (US); Eric M. Kropp, Oshkosh, WI (US)

(73) Assignee: Illinois Tool Works Inc., Glenview, IL (US)

(*) Notice: Subject to any disclaimer, the term of this patent is extended or adjusted under 35 U.S.C. 154(b) by 1414 days.

(21) Appl. No.: 11/742,357

(22) Filed: Apr. 30, 2007

(65) Prior Publication Data

US 2008/0264920 A1  Oct. 30, 2008

(51) Int. Cl.
*B23K 9/10* (2006.01)

(52) U.S. Cl.
USPC .......................................... 219/133

(58) Field of Classification Search
USPC .......................................... 219/133
See application file for complete search history.

(56) References Cited

U.S. PATENT DOCUMENTS

| | | | |
|---|---|---|---|
| 4,367,130 A * | 1/1983 | Lemelson | 204/157.42 |
| 6,534,958 B1 * | 3/2003 | Graber et al. | 322/11 |
| 6,989,509 B2 * | 1/2006 | Silvestro | 219/133 |
| 7,098,424 B2 * | 8/2006 | Silvestro | 219/133 |
| 7,403,850 B1 * | 7/2008 | Boutin et al. | 701/107 |
| 2003/0042237 A1 | 3/2003 | Brofft et al. | |
| 2005/0133489 A1 | 6/2005 | Gitter et al. | |
| 2006/0027547 A1 * | 2/2006 | Silvestro | 219/133 |

FOREIGN PATENT DOCUMENTS

JP  10115225 A  *  5/1998  .............. F02B 63/06

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A welding system is provided that includes an engine, a compressor coupled to the engine, and a regulator coupled to the compressor and located on a control panel. Another welding system is provided that includes an engine, a compressor coupled to the engine and a monitor circuit configured to monitor the duration of operation of the compressor by monitoring engagement of the clutch. A pressure gauge configured to be coupled to a compressor is also provided.

12 Claims, 7 Drawing Sheets

PORTABLE AIR COMPRESSOR/GENERATOR CONTROL METHOD AND SYSTEM

BACKGROUND

The invention relates generally to welding systems and more particularly to welding systems utilizing an engine coupled to an air compressor and welding generator in a single unit.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. An advantage of an engine-driven system is the potential portability of the system. For instance, welding systems that employ a generator coupled to an engine are typically configured as standalone units that do not have connections to a supplemental power source, such as a power grid. This may be useful for systems that are traditionally operated at remote worksites.

In addition to needing a source of welding current at a worksite, welding operators often desire other outputs to more efficiently complete a job. For example, a welding operator may also use compressed air to operate plasma cutters, air tools and the like. Typically, compressed air is provided via a standalone air supply. Thus, a welding operator may use, both, a standalone engine-driven welding generator and a standalone air supply. The independence of the two units may increase the amount of time and labor involved with setup, transportation, and so forth. In addition, the independence of the two units may result in an increased amount of maintenance and repair costs due to duplication of parts.

BRIEF DESCRIPTION

In one embodiment, a welding generator is provided. The welding generator includes an engine, a compressor coupled to the engine, and a regulator coupled to the compressor and located on a control panel.

In another embodiment, another welding generator is provided. The welding generator includes a compressor configured to couple to an engine via a clutch and a monitor circuit configured to monitor the duration of operation of the compressor by monitoring engagement of the clutch.

A pressure gauge is also provided. The pressure gauge is configured to be coupled to a compressor and includes a plurality of designated regions corresponding to a plurality of pressure ranges, wherein the plurality of pressure ranges correspond to a plurality of devices connected to the compressor or a critical pressure of the compressor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
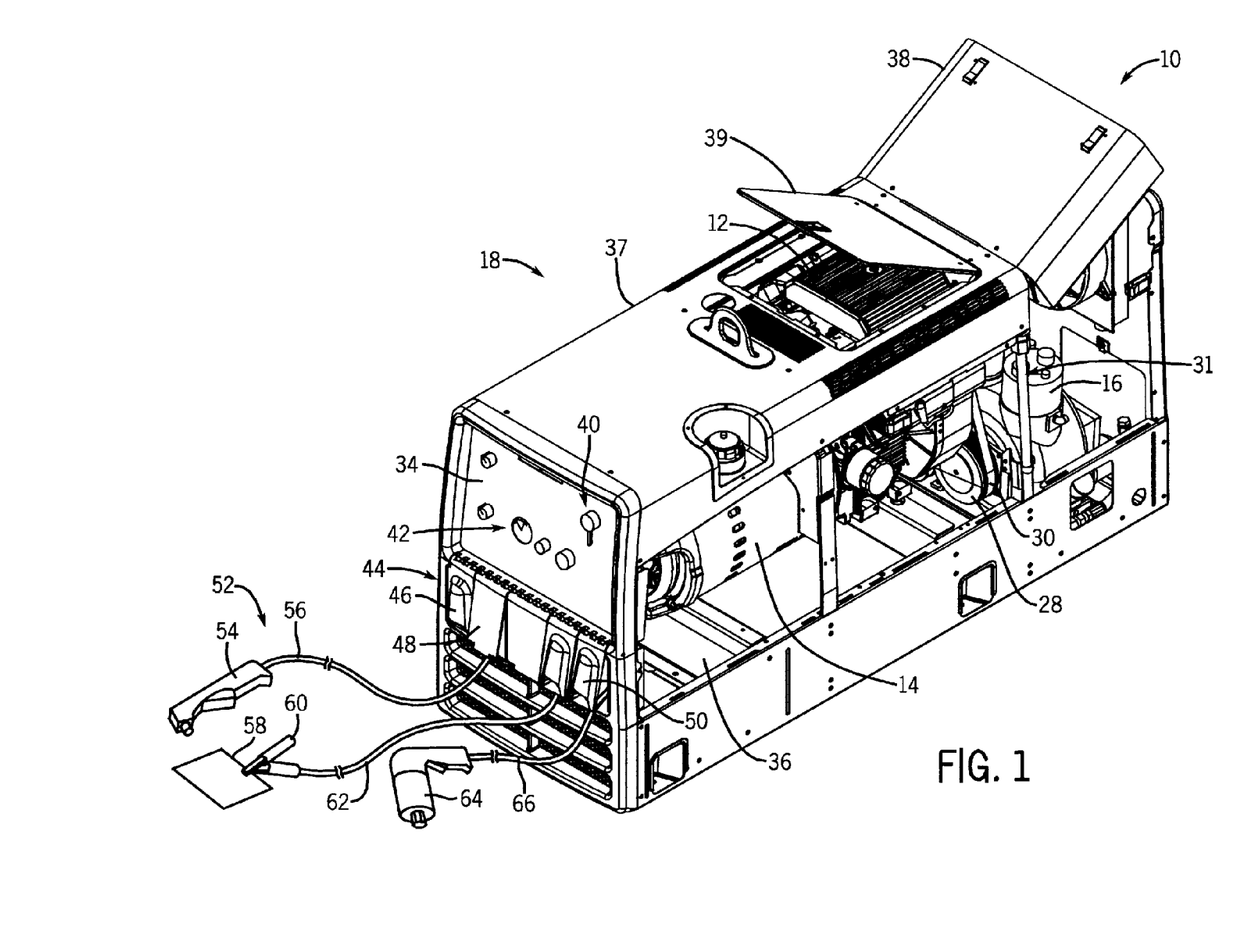
FIG. 1 is a partial perspective view of an exemplary engine-driven welding generator/compressor system, wherein two top access panels are rotated to open positions and a side access panel is removed to reveal various internal features in accordance with embodiments of the present invention.
Figure 2:
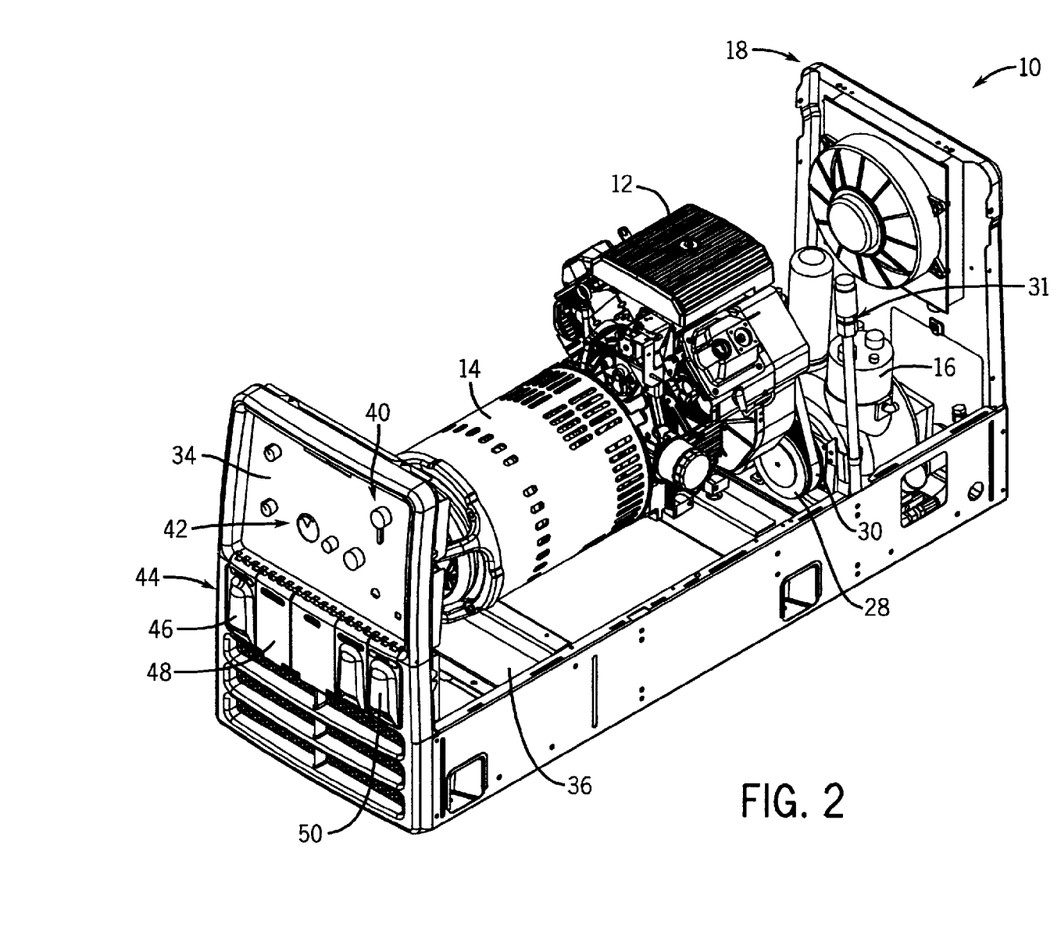
FIG. 2 is another partial perspective view of the welding generator/compressor system as illustrated in FIG. 1, wherein an entire top access panel assembly is removed to further illustrate various internal features in accordance with embodiments of the present invention.
Figure 3:
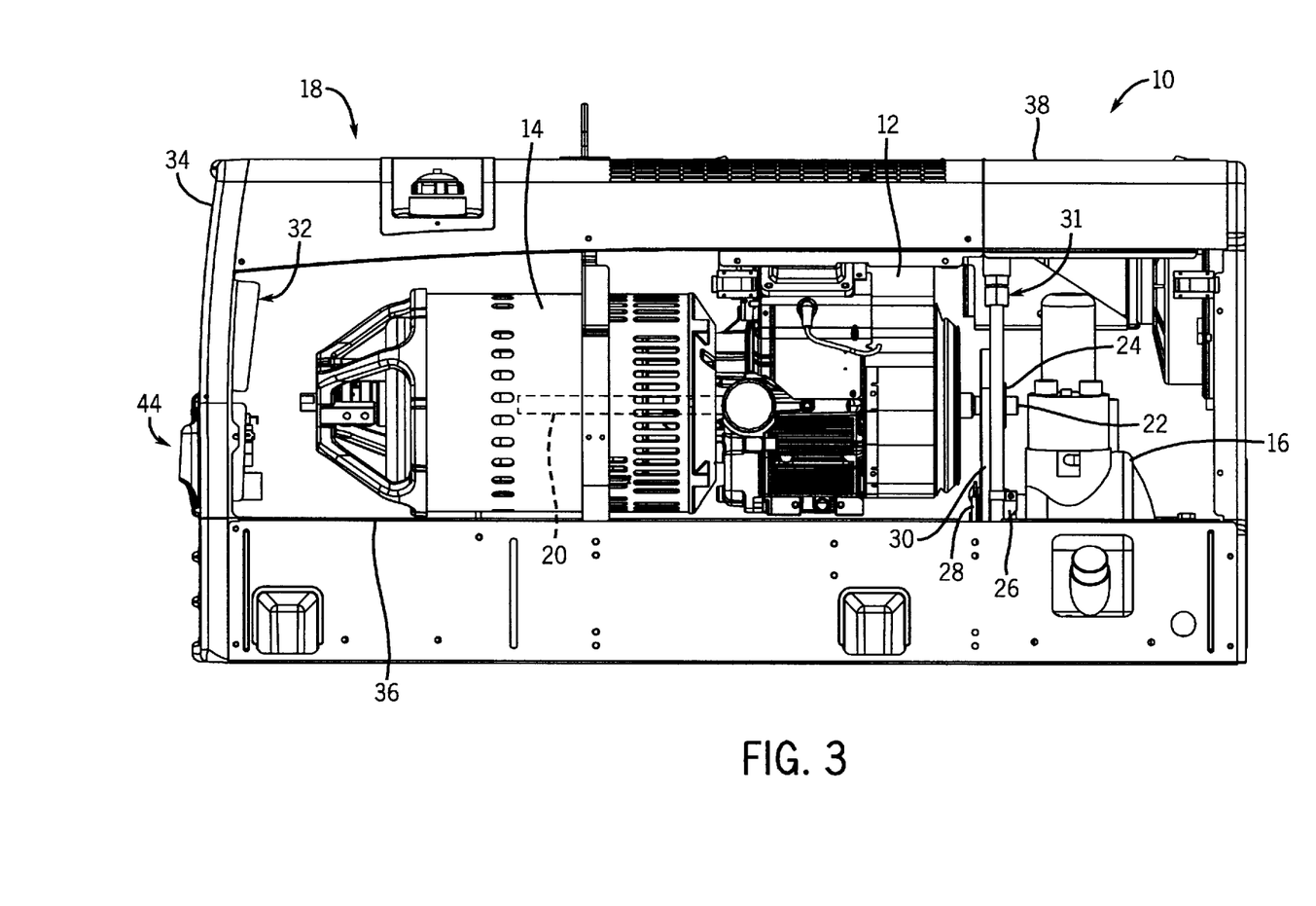
FIG. 3 is a side view of the welding generator/compressor system as illustrated in FIG. 1, wherein the two top access panels are rotated to closed positions and the side access panel is removed to further illustrate various internal features in accordance with embodiments of the present invention.

Referring now to the drawings, FIGS. 1-3 illustrate an engine-driven welding generator/compressor system 10 having an engine 12 drivingly coupled to a welding generator 14 and an air compressor 16 in a single enclosure 18 in accordance with an exemplary embodiment of the present technique. FIG. 1 is a partial perspective view of the system 10 with side access panels removed and top access panels or hatches rotated to open positions. FIG. 2 is another partial perspective view of the system 10 as illustrated in FIG. 1, wherein the entire top access panel assembly is removed to provide a better view of the internal features of the system 10. FIG. 3 is a side view of the system 10 as illustrated in FIGS. 1 and 2. As depicted, the system 10 is configured to provide multiple outputs, including welding current, alternating current (AC) power, and compressed air.

As discussed in detail below, the illustrated system includes a variety of features to improve serviceability, reliability, controllability, and integration of the air compressor 16 within the single enclosure 18 of the system 10. For example, the illustrated system 10 may include a top side oil fill to enable access at the top of the system 10, rather than a lower or more inaccessible oil fill location. The illustrated system 10 also may include unique control features, such as a load priority control configured to monitor various loads (e.g., generator 14, compressor 16, external loads, etc.) on the engine 12, identify possible overload conditions, and adjust the various loads based on priority levels. The control features also may include a specific air compressor load control, which may be configured to reduce the engine speed and/or gradually engage (e.g., via a clutch) the air compressor 16 during start up (e.g., a soft start control). Furthermore, the control features may include a specific air compressor control regulator, which may be mounted directly on a control panel (e.g., a front panel) of the system 10 rather than being in an inaccessible position well within the system 10. The system 10 also may include a battery and/or a battery charge system, which may include features to monitor conditions of the battery (e.g., internal or external to the system 10) and to adjust the characteristics of the charge (e.g., variable output level, duration, etc.).

In certain embodiments, the system 10 may be described as an air pack welding system (e.g., AIRPAK). The engine 12 provides output power (e.g., a mechanical output) to drive both the welding generator 14 and the air compressor 16. In the illustrated embodiment, the generator 14 is coupled to one side of the engine 12, while the compressor 16 is independently coupled to an opposite side of the engine 12. Thus, the engine 12 is sandwiched between the generator 14 and the compressor 16. In addition, the engine 12 may be mounted independently from the compressor 16, such that the two are mechanically isolated from one another. As discussed in further detail below, the isolation between the compressor 16 and the engine 12 may be addressed with a suitable engine-to-compressor coupling system, such as a geometrically adjustable coupling. The geometrically adjustable coupling may include a tensioning system coupled to a belt and pulley system, a special resilient or spring-like belt, a clutch, or a combination thereof, to provide some degree of flexibility, positional adjustability, or play. Thus, the geometrically adjustable coupling is configured to maintain a connection between the compressor 16 and the engine 12 despite variations in distance, vibrations, and so forth. In other words, the geometrically adjustable coupling provides a resilient or distance adjustable connection between the engine 12 and the compressor 16

As described below, the power from the engine 12 operates both the generator 14 and the air compressor 16 via a first shaft 20 and a second shaft 22 (e.g., stub shaft), respectively. In some embodiments, these shafts 20 and 22 may be independent from one another, while in other embodiments shafts 20 and 22 may be part of a single shaft extending through the engine 12. As illustrated, the shafts 20 and 22 extend out of opposite sides of the engine 12. These shafts 20 and 22 may be directly or indirectly coupled to one or more driven mechanisms. For example, an indirect coupling may include a belt and pulley system, a gear system, or a chain and sprocket system. In the present embodiment, the first shaft 20 couples directly to the generator 14, while the second stub shaft 22 couples indirectly to the compressor 16. However, either arrangement can be used for the connection between the engine 12 and the generator 14 and/or the compressor 16.

For example, as will be discussed in greater detail below, the engine 12 is coupled to the compressor 16 via a belt and pulley system including the stub shaft 22, a pulley 24 coupled to the shaft 22, a compressor drive shaft 26 coupled to the compressor 16, a compressor pulley 28 coupled to the shaft 26, and a drive belt 30 extending about the pulleys 24 and 28. Therefore, the engine 12 is capable of providing power to the generator 14 and the air compressor 16 simultaneously. In the illustrated embodiment, the engine 12 rotates the stub shaft 22 to transmit rotation and torque via the pulleys 24 and 28 and drive belt 30 to the compressor drive shaft 26 coupled to the air compressor 16. Accordingly, the mechanical energy generated by the engine 12 operates the air compressor 16. As discussed in detail below, in certain embodiments, the air compressor 16 includes a rotary screw compressor. Thus, the air compressor 16 and the system 10 may be capable of continuously providing large volumes of compressed air 16 to a desired application, such as a welding application, without any need for an intermediate storage tank.

The engine 12 includes a power source configured to provide power to the generator 14 and the air compressor 16. In an embodiment, the engine 12 may include a combustion engine powered by gas or diesel, LP fuel, natural gas, or other fuel and driving one or more drive shafts, e.g., 20 and 22. For example, the engine 12 may include an industrial gas/diesel engine configured to output anywhere from about 24 horsepower (Hp) to about 64 Hp. Generally, the weight of such an engine 12 may vary with the size and Hp rating of the engine. For example, a 64 Hp engine may weigh approximately 1900 lbs., whereas a similar 24 Hp engine may weigh less than approximately 1000 lbs. Thus, the portable system 10 may benefit from the use of a smaller engine 12.

As discussed previously, embodiments may include a generator 14 coupled to the engine 12. Thus, the generator 14 may convert the power output (e.g., mechanical energy) of the engine 12 to an electrical power. Generally, the generator 14 includes a device configured to convert a rotating magnetic field into an electrical current (e.g., AC generator). The generator 14 includes a rotor (rotating portion of the generator) and a stator (the stationary portion of the generator). For example, the rotor of the generator 14 may include the rotating drive shaft 20 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics. For example, the generator 14 may include a first section configured to drive a welding current to a welder and a second section configured to drive a current for other AC outputs. As suggested above, multiple generators 14 may be connected to the drive shaft 20 or stub shaft 22.

Also coupled to the engine 12, the air compressor 16 may provide a continuous source of compressed air for use in plasma cutting, pneumatic tools, inflating a tire, blowing-off/cleaning a work piece, and the like. For example, a welding operator may use compressed air as a high speed gas ejected from the nozzle of a plasma torch, or may use compressed air to operate tools, such as pneumatic impact wrenches, spray guns, saws, nail guns, screw drivers, drills, lifts, and chisels. In the illustrated embodiment, the air compressor 16 may be described as a continuous air supply compressor, an indirect mount air compressor, or both. For example, certain embodiments of the system 10 use a type of the compressor 16 that is not a piston-type air compressor mounted directly to the engine 12. In an embodiment, the air compressor 16 may include a rotary screw compressor or another suitable compressor 16 configured to supply a continuous flow of compressed air without the need for an intermediate storage tank.

Rotary screw compressors may include a type of gas compressor that has a rotary type positive displacement mechanism. The rotary screw compressor typically includes one or more screws, which rotate within an enclosure to gradually shrink a series of passages defined by threads of the screws and the surrounding enclosure. For example, the rotary screw compressor may include a plurality (e.g., pair) of counter rotating screws, which intermesh with one another to progressively reduce air volumes between the intermeshed threads (e.g., a series of shrinking volumes of air). For example, air is drawn in through an inlet port in the enclosure, the gas is captured in a cavity, the gas is compressed as the cavity reduces in volume, and the gas is finally discharged through another port in the enclosure. The design of a rotary screw air compressor 16 generally provides for high volumes of compressed gas in a continuous manner without the need for an intermediate storage tank.

Accordingly, the rotary screw air compressor 16 may provide a direct supply of compressed air on-demand to a desired application. For example, a plasma cutter may consume air directly from the unit without the air being compressed into a tank, as generally done by piston-driven air compressors. However, an embodiment including a rotary screw air compressor 16 may include an air tank configured to store the compressed air. For example, a user may want to generate air for a given period and store the compressed air for a later use.

Further, the rotary screw air compressor 16 may be configured to operate at high speeds and, thus, may use less gearing and space to couple the rotary screw air compressor 16 to the engine 12. For example, in an embodiment, the system 10 may include a rotary screw air compressor 16 operating at speed near the engine speed, such as 4000 rpm. Thus, the pulley 24 and the compressor pulley 18 may include similar 1 to 1 ratios and not use a significantly larger compressor pulley 28 to step down the engine speed to accommodate the air compressor 16.

The system 10 may also have an oil fill assembly 31 that enables a user to perform regular maintenance on the air compressor 16. For example, as depicted, the oil fill assembly 31 may include a configuration to provide improved access to components of the air compressor 16 that may otherwise be obscured by other devices within the system 10. Accordingly a user may easily check and add fluids to the air compressor 16. For example, the oil fill assembly 31 may be described as an extension, add-on, or retrofit system configured to relocate the oil fill location from well within the system 10 to a top access location.

The system 10 may also include control circuitry to coordinate functions of a plurality of devices. For example, as depicted in FIGS. 1-3, the system 10 includes control circuitry 32 in the vicinity of a control panel 34. In an embodiment, the control circuitry 32 may include a processor, memory, and software code configured to control and or coordinate operation of the system 10. For example, the control circuitry 32 may monitor and control the speed and load on the engine 12, the electrical output and loads on the generator 14, the air output and loads on the compressor 16, the startup procedures (e.g., soft start of compressor 16), and/or the like. For example, as mentioned above, the control circuitry 32 may identify an overload condition in response to sensed data, and then reduce the output to protect the system 10. The control circuitry 32 also may reduce the engine speed, gradually increase the engine speed, and/or gradually engage a clutch during start up of the compressor 16. The control circuitry 32 also may automatically adjust the outputs (e.g., compressed air output or electrical output) based on default or user defined priority levels, minimum workout output levels, maximum output levels, safety features, and so forth. The control circuitry 32 also may adjust output levels (e.g., compressed air output or electrical output) based on a particular application, sensed feedback, and other closed-loop controls. For example, the control circuitry 32 may gradually decrease an electrical output for a battery charging procedure based on sensed feedback from the battery, thereby maximizing the charge without overcharging the battery.

As depicted in FIGS. 1-3, the enclosure 18 includes a common base or frame 36 with various access panels to enable servicing, repair, and so forth. For example, a pair of side access panels (removed) is configured to attach to opposite sides of the frame 36. A top 37 of the enclosure 18 includes first and second access panels or hatches 38 and 39, which are both rotatable between open and closed positions above the components of the system 10. As illustrated, the first hatch 38 can rotate open to enable access to the compressor 16, the oil fill assembly 31, and other features. The second hatch 39 can rotate open to enable access to the engine 12 and other features.

As depicted, the control panel 34 is coupled to an end of the enclosure 18 near the generator 14. The control panel 34 may include various control inputs, indicators, displays, electrical outputs, air outputs, and so forth. In an embodiment, a user input 40 may include a knob or button configured for a mode of operation, an output level or type, etc. For instance, the user input 40 may include a dial rotatable to select a mode of operation, such as a DC weld, an AC weld, a battery charge, or a tool operation. The control panel 34 may also include various indicators 42 to provide feedback to the user. For example, the indicator 42 may include an LCD to display voltage, amperage, air pressure, and the like. Embodiments of the control panel 34 include any number inputs and outputs, such as welding methods, air compressor settings, oil pressure, oil temperature, and system power. Further, the user inputs 40 and indicators 42 may be electrically coupled to the control circuitry 32 and enable a user to set and monitor various parameters within the control circuitry 32 and other devices of the system 10.

The illustrated system 10 also includes various external connections 44. The external connections 44 may include various outlets and couplers configured to provide access to the electrical power and the compressed air generated by the system 10. For example, the illustrated external connections 44 include an AC power output 46, a DC power output 48, and a compressed air output 50. In an embodiment these outputs 46, 48 and 50 are coupled to various devices and tools. For example, the AC power output 46 or the DC power output 48 can be coupled to various welding and cutting tools 52. As depicted, the welding/cutting tools 52 included a torch 54 coupled to the external connection 44 via a supply conduit 56. For instance, the welding devices may receive current from the generator 14 via the external connections 44. In such an embodiment, the torch 54 may be used to weld or cut a work piece 58 coupled to the external connections 44 via a work clamp 60 and a cable 62. As will be appreciated, the torch 54 may include various welding devices, such as a TIG (tungsten inert gas) torch, a MIG (metal inert gas) gun, or a plasma cutting torch. Similarly, the system 10 may provide compressed air from the air compressor 16 via the compressed air output 50. The air hose 66 may exit the system 10 at various other locations; including the back of the system 10 proximate to the air compressor 16. For example an air tool 64 may be coupled to the compressed air output 50 via an air hose 66. The air tool 64 may include various pneumatic tools and the like. In another embodiment, a plasma cutting torch 54 may receive power from an external unit (e.g., wall outlet AC power) while receiving compressed air from the air compressor 16 of the system 10.

As discussed previously, the system 10 may include multiple components working in cooperation to generate power, compressed air, and other outputs. For example, in the illustrated embodiment, a single engine 12 is coupled to the generator 14 and the air compressor 16. As will be appreciated, mechanical design of such a system 10 may entail various arrangements of components to provide an efficient and reliable system 10. For instance, if the components are not positioned correctly with respect to one another, then the misalignment may cause premature wear and/or failure of the system 10 and its components. For example, misalignment of the stub shaft 22 may reduce the efficiency of the system and create additional wear on bearings within the air compressor 16 or the engine 12. Further, each of the components may have a tendency to vibrate and, thus, increase the wear potential on surrounding components. Such a vibration may also reduce the appeal to operators, as the system 10 may not run as quietly and smoothly as desired. As discussed in further detail below, various features of the system 10 are configured to align and isolate components, including the engine 12 and the air compressor 16.

Figure 4:
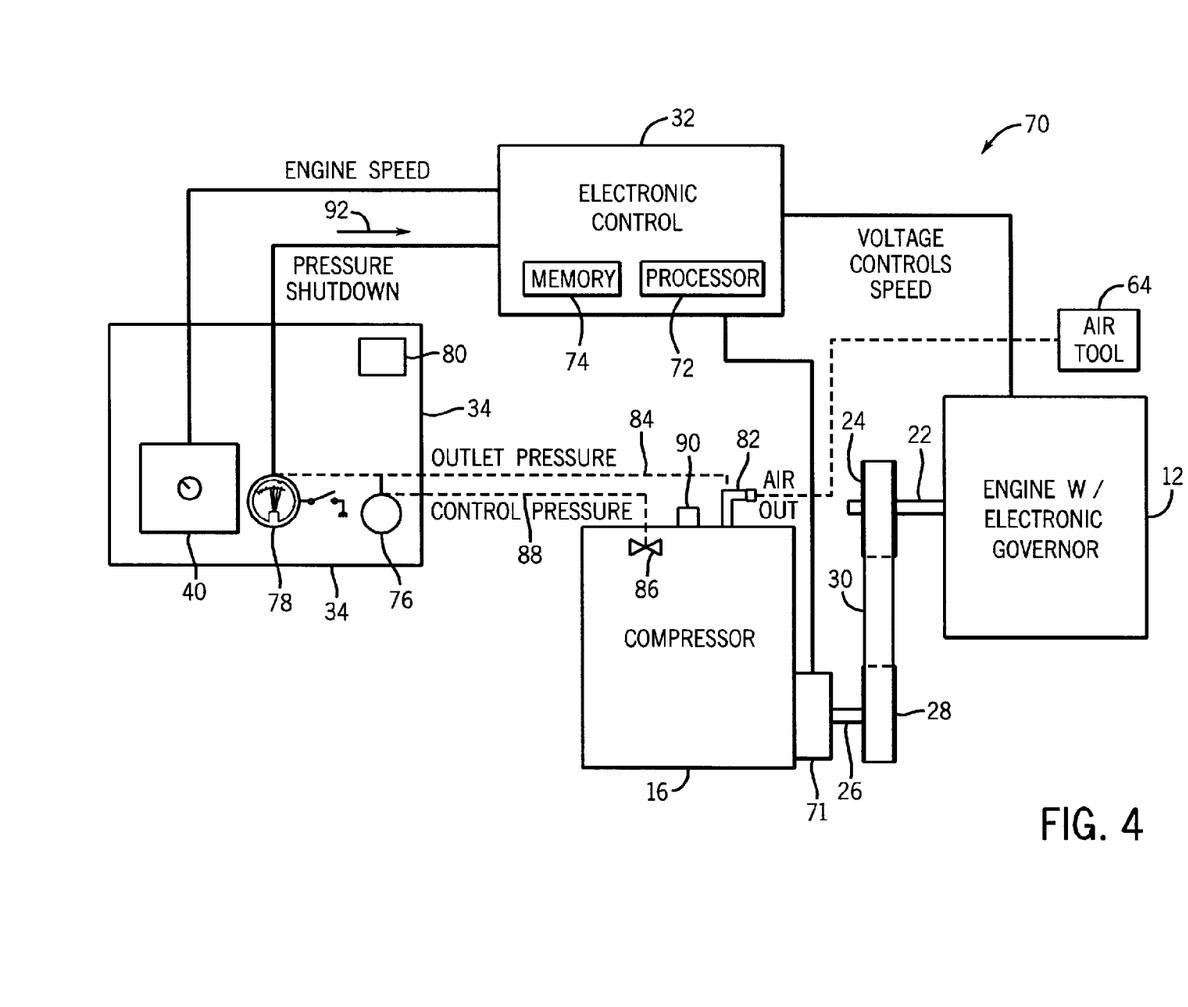
FIG. 4 is a block schematic of an exemplary embodiment of the welding system and control panel as illustrated in FIGS. 1 and 2.

FIG. 4 is a block schematic illustrating an embodiment of a control and monitoring system 70 of the welding system 10, wherein pressure, flow, or other operation parameters of the air compressor 16 are controlled or regulated directly on the control panel 34. Again, the illustrated system 10 includes the air compressor 16 drivingly coupled to the engine 12 via the stub shaft 22, the pulley 24, the drive belt 30, the compressor pulley 28, and the compressor drive shaft 26 as discussed above. The illustrated system 10 also includes a clutch 71 configured to enable engagement and disengagement of the compressor 16 with the compressor pulley 28 and, in turn, the engine 12. For example, the clutch 71 may include an electromagnetic clutch, a wet clutch, or another suitable clutch configuration.

The illustrated system 70 of FIG. 4 includes the control circuitry 32 having a processor 72 and memory 74, wherein the system 70 may be controlled or monitored by an operator through the control panel 34. The control panel 34 includes a regulator 76, a pressure gauge 78, and one or more user inputs 40, which may be used to monitor, regulate, or generally control various features of the air compressor 16 as discussed in further detail below. For example, the regulator 76 enables tool-free control of the air pressure of the air compressor 16, rather than requiring special tools, interior access well within the system 10, or other more time consuming tasks to adjust these operational parameters. In the present embodiment in which the compressor 16 provides a continuous supply of compressed air without an intermediate tank (e.g., a rotary screw compressor rather than a piston-type compressor), the foregoing placement of the regulator 76, the pressure gauge 78, and inputs 40 are particularly advantageous. In other words, given that the compressor 16 may be directly coupled to a particular pneumatic device or load, such as a plasma cutter, the ability to adjust air pressure, flow rate, or both, has a direct impact on the performance of the application (e.g., the effectiveness of the plasma cutter).

The inputs 40 may include one or more knobs, buttons, switches, keypads, or other devices configured to select an input or display function, as discussed further herein. The control panel 34 may include one or more display devices 80, such as an LCD display, to provide feedback to the operator. As will be appreciated, the control panel 34 is not limited to the components described herein, and may include any number of components as desired or required for monitor or control of the system 70, such as multiple user inputs, display devices, gauges, etc.

The air compressor 16 includes an outlet connection 82 for connection to air-operated devices, such as plasma cutters, impact wrenches, drills, spray guns, lifts, or other pneumatic-driven tools. Additionally, an outlet pressure line 84 is connected to the regulator 76 and the pressure gauge 78. An inlet valve 86 is located at the inlet of the air compressor 16. A control pressure line 88 is connected from the inlet valve 86 to the regulator 76 to provide for control of the pressure generated by the air compressor 16. The regulator 76 is configured to regulate pressure via the outlet pressure line 84 and the control pressure line 88. In other words, an operator can visualize the current pressure provided by the compressor 16 via the pressure gauge 78, and then adjust the pressure up or down via the regulator 76.

The regulator 76 is located on control panel 34 to provide easy access and control of the pressure of the air compressor 16. Further, the regulator 76 includes a tool-less knob for adjustment of the control pressure line 88. An operator may turn the knob in one direction to tighten the regulator 76, reduce the control pressure, and therefore reduce the outlet pressure generated by the compressor 16. If more pressure is desired for an application (e.g., an air tool such as an impact wrench), an operator may turn the knob in another direction to loosen the regulator, increase the control pressure, and therefore increase the outlet pressure of the regulator. The operator may adjust the regulator to provide different air pressure to the various air-operated devices that may be connected to outlet line 84. Pressure gauge 78 allows an operator to visually monitor the pressure generated by the air compressor 16. Thus, by using the regulator 76 in combination with the pressure gauge 78, an operator can accurately monitor, adjust, and control the pressure generated by the compressor 16.

An operator may desire to decrease the pressure generated by the compressor 16 to enable the generator 14 to draw more mechanical power from the engine 12 to increase electrical power, for example, to increase the electrical power supplied to a plasma cutter. An operator may use the gauge 78 and the regulator 76 to ensure the pressure generated by the compressor 16 stays within the operating pressure range of the plasma cutter, while at the same time reducing the pressure to provide more power to the plasma cutter. Additionally, an operator may control air flow rate by controlling the speed of the engine 12 controlled by the control circuitry 32 described above. An operator may control the speed of the engine 12 by adjusting the user inputs 40 on the control panel 34. Thus, by controlling both air pressure through the regulator 76 and engine speed/air flow through the user inputs 40, an operator may select the necessary air requirements for a plasma cutter, air tool, or other device connected to the system 10.

Pressure gauge 78 may be any type of pressure gauge having a measurement range suitable for the range of pressures generated by the air compressor 16. The illustrated pressure gauge 78 includes an analog face having marks corresponding to pressure values that may be any desired unit of measurement, such as PSI, atm, bar, Pascals, mmHg, etc. As will be explained further below, the face of the pressure gauge 78 includes designated regions showing the operating pressure ranges of different air-operated devices connected to the air compressor 16. Additionally, the designated regions may show a maximum or critical pressure beyond which the air compressor 16 may not be safely operated. The system 70 also may include an automatic shutoff control to disengage the compressor 16 from the engine 12, or shutoff the engine 12, or release pressure from the compressor 16, or a combination thereof, if a critical pressure is reached or exceeded as indicated on the gauge 78.

As discussed above, the air compressor 16 has a range of operating pressures depending on the size of the components of the compressor, such as the case, inlet and outlet valves and the rotary screw mechanism. The top end of this operating pressure range indicates a maximum or critical pressure that the operating pressure of the compressor 16 that may increase wear or cause damage to the compressor 16 or other components of the system 10. For example, in one embodiment, the compressor 16 may have a maximum or critical pressure of 150 PSI. If the operating pressure of the air compressor 16 exceeds this pressure, then internal components of the air compressor 16, the housing of such internal components, or the air compressor 16 may be damaged. In addition, internal oil pressures may also reach a critically high level, resulting in oil blowback and damage to internal seals.

Accordingly, the illustrated air compressor 16 includes a pop-off valve 90 that is configured to open if the pressure of the compressor 16 exceeds the maximum or critical pressure. The pop-off valve 90 provides a relief point that opens to reduce the possibility of potential damage associated with exceeding the maximum or critical pressures. Instead of a critically high pressure causing blowing back through the compressor or damaging internal components, the pressure will be relieved through the opening of the pop-off valve 90. Problematically, however, the pressure to open the pop-off valve 90 may also propel oil out of the open pop-off valve 90. Because the compressor 16 is in small enclosure, with other moving components such as the belt and pulley system 24, 28, and 30, the oil may damage or detrimentally affect operation of other components in the welding system.

The control system 70 is configured to add safety to address the possibility that an operator may intentionally or accidentally open the regulator 76, such that the maximum or critical pressure of the air compressor 16 is reached. Again, the control system 70 may provide an automatic shutoff function to shutoff the compressor 16 before or if the maximum or critical pressure is reached. The automatic shutoff function automatically disengages the clutch 71 coupling the air compressor 16 to the compressor pulley 28 and the stub shaft 22 of the engine 12, thereby turning off the compressor 16 and allowing the pressure to decrease. The electronic control 32 is configured to receive a shutdown signal 92 from the pressure gauge 78. The pressure gauge 78 sends a shutdown signal to the electronic control 32 if the pressure gauge detects a pressure near or at the maximum or critical pressure. For example, to ensure the pop-off valve 90 does not open, the shutdown signal may be configured to be sent when the pressure gauge 78 detects a pressure slightly below the maximum or critical pressure. Once the electronic control 32 receives the shutdown signal 92 from the pressure gauge 78, the electronic control 32 disengages the electronic clutch 71 and shuts down the air compressor 16. Alternatively, the electronic control 32 may receive pressure values from the pressure gauge 78 or a pressure sender located elsewhere in the system and make the determination to shutdown the compressor 16 based on those values, instead of receiving a shutdown signal from the pressure gauge 78. Alternatively, the pressure level sensed by the gauge 78 may be used to initiate an automatic shutdown of the engine 12, automatic release of pressure via the valve 90, or automatic adjustment of the inlet valve 86, or a combination thereof, to reduce pressure in response to a critical pressure. In other embodiments, the automatic shutdown may be initiated by a pressure switch located elsewhere in the system.

As the air compressor 16 may undergo periodic maintenance, it may be useful for the operator to know how long the compressor has been operating or maintenance time intervals, such as the remaining hours of operation before maintenance is required. Advantageously, the control system 70 provides for storage of the hours of operation of the air compressor and the time remaining before elapse of a predetermined time interval, such as service and/or maintenance time interval. The memory 74 of the electronic control 32 may be configured to store the duration of operation of the compressor 16, a predetermined service and/or maintenance time interval, and the time remaining before elapse of the predetermined time interval as determined by the processor 72. The duration of operation of the compressor 16 may be determined from the engagement of the electronic clutch 71. The electronic control 32 monitors the duration of the engagement of the electronic clutch 71 and stores that value as the duration of operation of the compressor 16. The duration may be stored as any unit of time, such as hours, minutes, etc, and the processor 72 may include functions for converting between different units of time. A predetermined service and/or maintenance interval, such as a scheduled maintenance period, may be stored in the memory 74 during programming of the electronic control 32. Typically, the capacity and type of the compressor 16 provide for a specific scheduled maintenance period. For example, a rotary screw compressor that uses oil for lubrication of the rotating screws may undergo oil changes after a certain time interval. The service interval may be entered into the electronic control 32, and stored as any unit of time such as hours, days, etc. The processor 72 may compare the stored duration of operation of the compressor to the predetermined service and/or maintenance interval and calculate the amount of time left before compressor maintenance is desired. Additionally, the processor 72 may calculate the amount of time the compressor 16 has been operated after elapse of the predetermined service and/or maintenance interval.

The display device 80 may display the stored duration of operation of the compressor and the predetermined time interval through operation of the user input 40. For example, in one embodiment, the user input 40 may be a knob that provides selection of either the duration of operation of the compressor 16 or the hours remaining until the oil in the compressor 16 should be changed. If the operator turns the user input 40 to the designated position in the compressor quadrant marked, for example, "HRS," then the duration of operation of the compressor 16 may be displayed on display device 80. If the operator turns the user input to the designated position in the compressor quadrant marked, for example, "OIL CHANGE," then the remaining hours left before the predetermined time interval has elapsed will be displayed on the display device 80. However, if the predetermined time interval has elapsed, a negative number may be displayed on display device 80, indicating the number of hours the compressor 16 has been operated past the predetermined service and/or maintenance interval. The control panel 34 also provides for resetting the preselected time interval countdown, through operation of the user input 40 and/or additional user inputs on the control panel 34. In this manner, an operator may periodically check the maintenance time interval on the compressor 16 and determine if maintenance is desirable.

Figure 5:
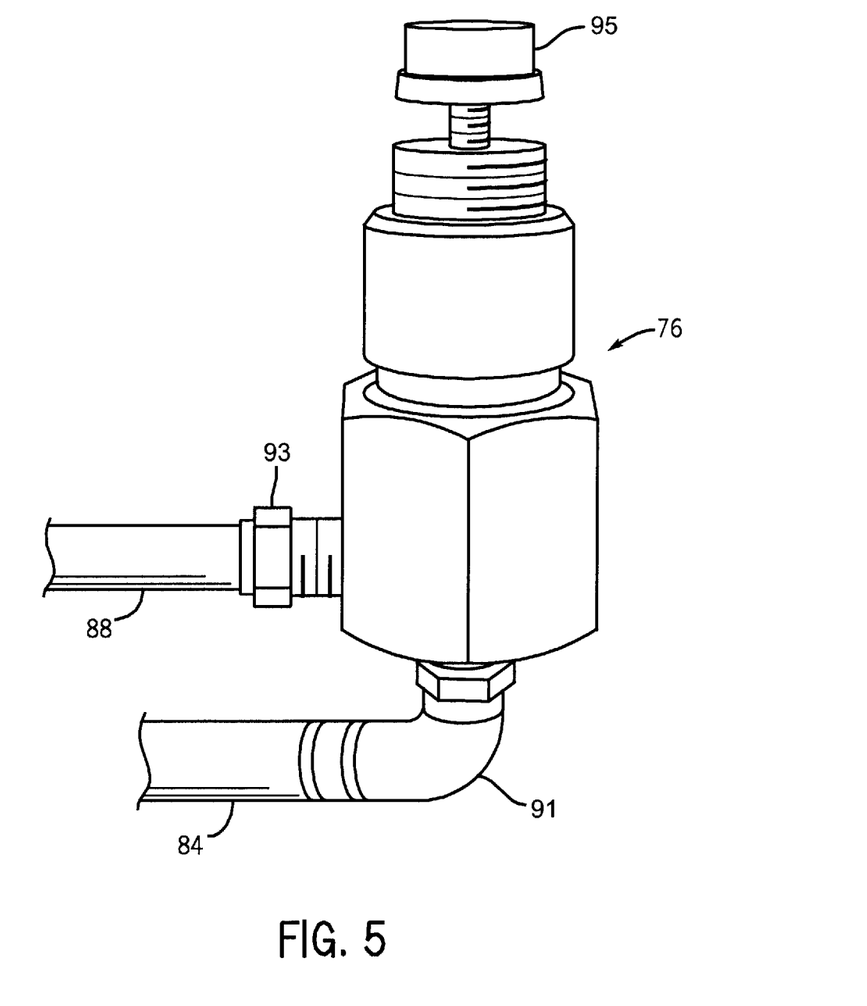
FIG. 5 is an illustration of a tool-less regulator in accordance with an exemplary embodiment of the present invention.

FIG. 5 is a perspective view of an exemplary embodiment of the tool-less regulator 76. As discussed above, the tool-less regulator 76 is located on the control panel 34 and enables an operator to control the air compressor 16 without internal access into the system 10 and without any special tools. The tool-less regulator 76 has an outlet connector 91, an inlet/control line connector 93, and a knob 95 for adjusting the regulator. The control line connector 93 of the regulator 76 is connected to the control pressure line 88, and the outlet connecter 91 is connected to the outlet pressure line 84. By relocating the regulator 76 to the control panel 34, the regulator is more easily accessible to an operator of the welding system. Adjustment of the knob 95 does not require any tools, and allows easy adjustment of the pressure generated by the air compressor 16 to match the various air tools connected to the output of the air compressor 16. For example, to reduce the control pressure to the compressor 16, an operator may turn the knob 95 in one direction. The outlet pressure generated by the compressor 16 will then be reduced. To increase the outlet pressure generated by the compressor 16, the operator may turn the knob in another direction and increase the control pressure provided to the compressor 16.

Figure 6:
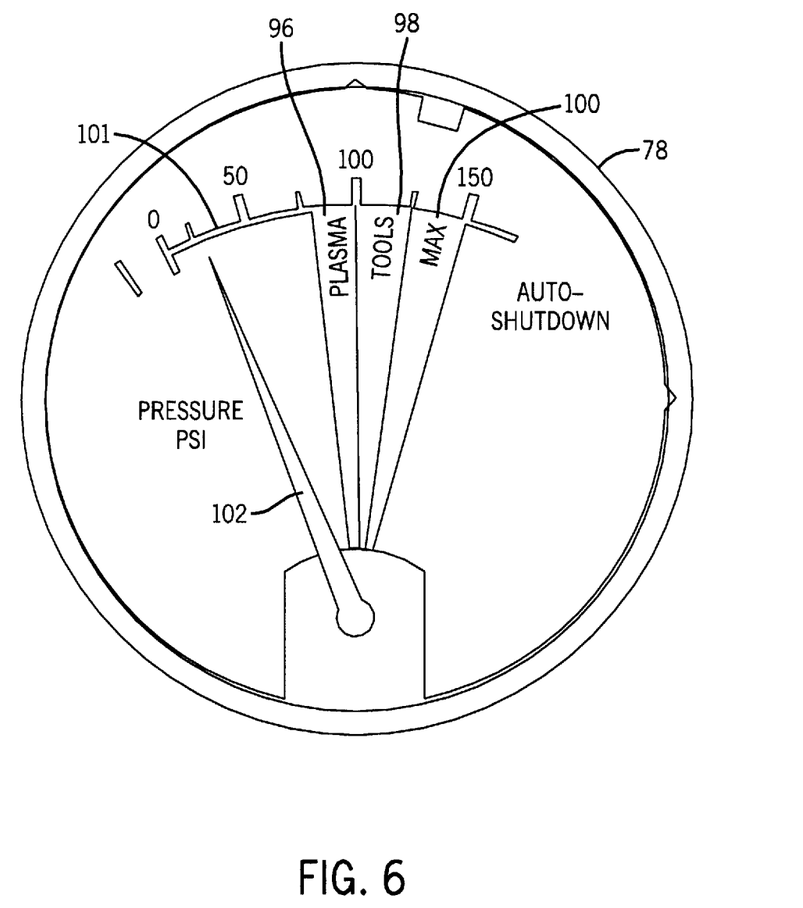
FIG. 6 is an illustration of a pressure gauge having designated regions in accordance with an embodiment of the present invention.

FIG. 6 is a front view of an exemplary embodiment of the pressure gauge 78, illustrating multiple designated regions 96, 98, and 100 for different applications and control. The pressure gauge 76 also includes pressure indications 101 which may be in any unit of measurement, as discussed above. In the illustrated embodiment, pressure indications 101 depict graduations of pressure in units of PSI. The pressure gauge 76 includes a needle 102 that moves in response to the pressure received from outlet pressure line 84 of the compressor 16. In combination with designated regions 96, 98, and 100, the needle 102 may indicate if the pressure generated by the air compressor 16 is within a range suitable to run various air-operated devices connected to the air compressor 16.

In the illustrated embodiment of FIG. 6, designated region 96 includes the text "PLASMA" to indicate a pressure range suitable for operation of a plasma cutter. Designated region 98 includes the text "TOOLS" to indicate a pressure range suitable for operation of air tools such as an impact wrench or drill. Finally, designated region 100 includes the text "MAX" to indicate the maximum or critical pressure range of the air compressor 16. If the operator observes that the needle 102 is in the designated range 100, i.e., indicating that air compressor 16 is operating near the maximum or critical pressure range, then the operator may reduce the operating pressure of the air compressor 16 by turning the regulator 76. As discussed above, however, the control system 70 may use a signal from the pressure gauge 78 to indicate that the compressor 16 is operating at a critical or maximum pressure and disengage the compressor clutch 71. As illustrated, designated regions 96, 98, and 100 may have alternating colors to contrast with the face of the pressure gauge 76 or with the adjacent designated region. Although the embodiment depicted has three designated regions, it should be appreciated that any number of designated regions may be included on the face of the pressure gauge 76, and may indicate pressure ranges corresponding to any type of air-operated device or other desirable pressure range of interest. For example, designated regions may include different pressure ranges, overlapping or one after another, for applications of plasma cutting, pneumatic spray guns, pneumatic tools, pneumatic lift, and so forth.

Figure 7:
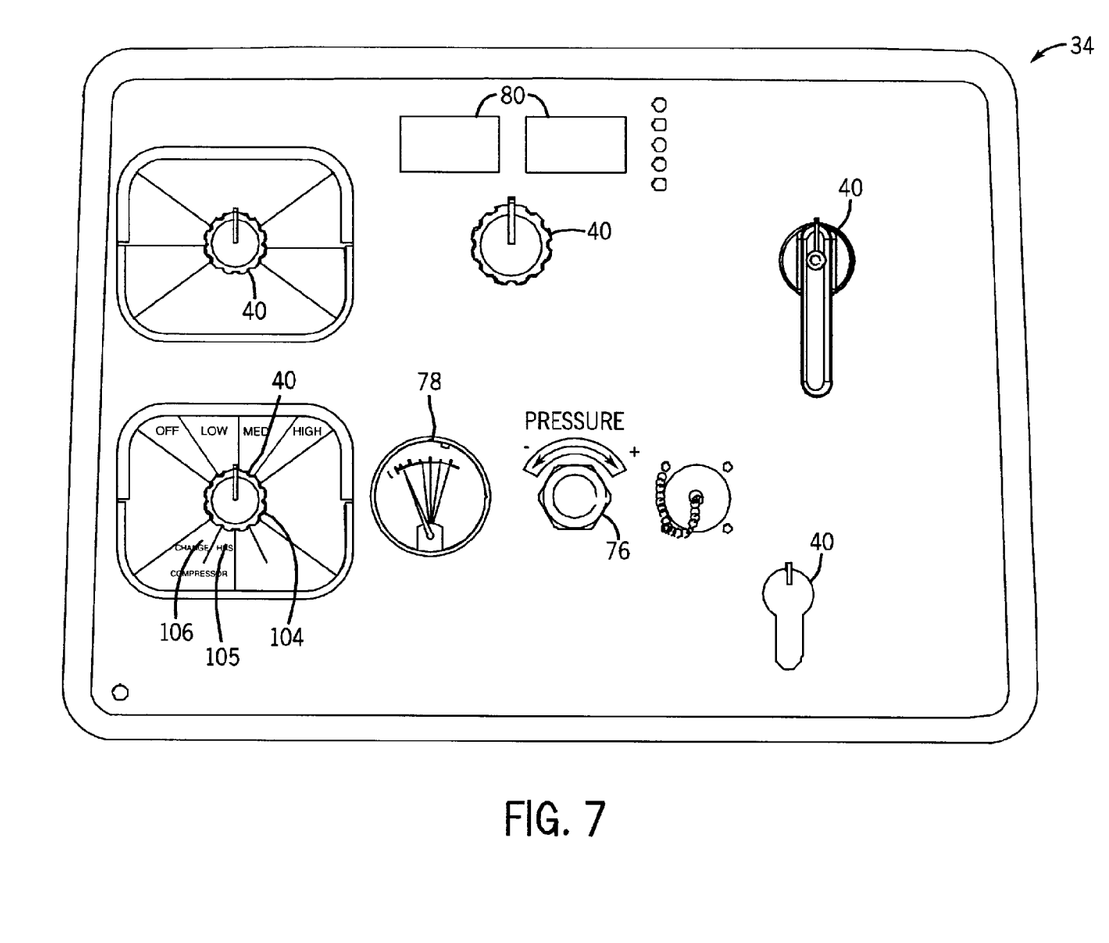
FIG. 7 is an illustration of a control panel with a display device in accordance with an embodiment of the present invention.

FIG. 7 illustrates a front view of control panel 34 in accordance with an embodiment of the present invention. As discussed above, control panel 34 may have one or more user inputs 40, the regulator 76, the pressure gauge 78, and the display device 80. As shown in the embodiment in FIG. 7, the user inputs 40 may include one or more knobs and switches. The knobs and switches may control operation of the engine 12, the generator 14, and the compressor 16. As discussed above, the regulator 76 and the pressure gauge 78 enable an operator to control and adjust the pressure generated by the compressor 16 completely outside the enclosure 18 of the system 10. In other words, the regulator 76 and 78 are disposed separate and remote from the compressor 16 in an operator-accessible area on the panel 34.

One of the user inputs 40 may be a selection knob 104 that enables the operator to select a value for display on display device 80. For example, as discussed above in one embodiment, the electronic control 32 may store the duration of operation of the air compressor and a scheduled maintenance interval for the compressor, such as an oil change interval. An operator may turn the selection knob 40 to area 105, labeled "HRS," to select display of the hours the compressor has been in operation. The value, e.g., the number of hours the clutch 71 of the compressor 16 has been engaged, is then displayed on the display device 80. Additionally, an operator may turn the knob 104 to the area 106, labeled "OIL CHANGE," to select display of the hours remaining before the scheduled maintenance interval has elapsed. The number of hours remaining before the maintenance interval has elapsed will be displayed on the display device 80. As discussed above, if the maintenance interval has already elapsed, then a negative value may be displayed on display device 80 indicating the number of hours the compressor has been operated past the scheduled maintenance interval.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising: an engine; a welding generator coupled to the engine; a compressor coupled to the engine; and a regulator coupled to the compressor and located on a control panel without an intermediate storage tank coupled to the compressor; wherein the compressor comprises a release valve configured to open if the compressor exceeds a critical pressure.

2. A system, comprising:
   a compressor configured to couple to an engine via a clutch; and
   a monitor circuit configured to monitor a duration of operation of the compressor by monitoring engagement of the clutch.

3. The system of claim 2, wherein the compressor comprises a rotary screw compressor.

4. The system of claim 2, wherein the monitor circuit comprises a processor and memory configured to store the duration of operation of the compressor.

5. The system of claim 2, comprising a display configured to display the duration of operation of the compressor.

6. The system of claim 5, wherein the display is configured to display a remaining duration of operation of the compressor before elapse of a target time interval.

7. The system of claim 6, wherein the target time interval comprises a scheduled maintenance interval.

8. The system of claim 7, wherein the display is configured to display a negative value if the scheduled maintenance interval is exceeded.

9. The system of claim 2, comprising a regulator coupled to the compressor and located on a control panel.

10. The system of claim 2, comprising the engine coupled to the compressor via the clutch.

11. The system of claim 10, comprising a welding generator coupled to the engine.

12. The system of claim 2, comprising a torch, a spray gun, a tool, or a combination thereof, connected to the compressor.

* * * * *